(12) United States Patent
Dutta et al.

(10) Patent No.: US 10,866,485 B2
(45) Date of Patent: Dec. 15, 2020

(54) MAGNETOELECTRIC-BASED SYSTEMS AND METHODS FOR MODULATING TERAHERTZ BEAMS

(71) Applicants: Moumita Dutta, San Antonio, TX (US); Ruyan Guo, San Antonio, TX (US); Amar Bhalla, San Antonio, TX (US); Soutik Betal, San Antonio, TX (US)

(72) Inventors: Moumita Dutta, San Antonio, TX (US); Ruyan Guo, San Antonio, TX (US); Amar Bhalla, San Antonio, TX (US); Soutik Betal, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 16/386,229

(22) Filed: Apr. 16, 2019

(65) Prior Publication Data

US 2019/0317378 A1    Oct. 17, 2019

Related U.S. Application Data

(60) Provisional application No. 62/658,233, filed on Apr. 16, 2018.

(51) Int. Cl.
*G02F 1/355* (2006.01)
*G02F 1/35* (2006.01)

(52) U.S. Cl.
CPC .......... *G02F 1/3551* (2013.01); *G02F 1/3558* (2013.01); *G02F 2001/3528* (2013.01); *G02F 2203/13* (2013.01)

(58) Field of Classification Search
CPC .......... H01L 41/083; H03C 1/02; H03C 3/42; G02F 1/3551; G02F 2203/13; H01F 1/0054; H01F 1/344
USPC ...................................... 250/504 R; 332/145
See application file for complete search history.

(56) References Cited

U.S. PATENT DOCUMENTS

| 4,648,991 | A | * | 3/1987 | Fang ..................... H01L 37/025 136/213 |
| 5,433,917 | A | * | 7/1995 | Srivastava ............ C04B 35/491 419/10 |
| 10,594,261 | B2 | * | 3/2020 | Dutta ..................... H01L 41/083 |
| 2003/0035610 | A1 | | 2/2003 | Keys |
| 2016/0238452 | A1 | * | 8/2016 | Binzaid ..................... G01J 5/02 |

(Continued)

OTHER PUBLICATIONS

Dutta et al., "Magnetoelastoelectric coupling in core-shell nanoparticles enabling directional and mode-selective magnetic control of THz beam propagation", 2017, Nanoscale, 9, 13052-13059 (Year: 2017).*

(Continued)

*Primary Examiner* — David A Vanore
(74) *Attorney, Agent, or Firm* — Thomas Horstemeyer, LLP (57) ABSTRACT

A system for modulating a terahertz beam includes a multiferroic nanoparticle heterostructure through which a terahertz beam can be propagated, and means for applying an external direct current (DC) magnetic field to the multiferroic nanoparticle heterostructure and the terahertz beam propagating through it, wherein application of the DC magnetic field modulates one or both of an amplitude and a phase of the terahertz beam.

20 Claims, 10 Drawing Sheets

(56) References Cited

U.S. PATENT DOCUMENTS

| | | | |
|---|---|---|---|
| 2018/0026581 A1* | 1/2018 | Dutta | H03C 3/42 |
| | | | 332/145 |
| 2018/0297858 A1* | 10/2018 | Betal | C01G 51/00 |
| 2019/0317378 A1* | 10/2019 | Dutta | G02F 1/3551 |

OTHER PUBLICATIONS

Gayen, Dilip Kumar, and Jitendra Nath Roy. "All-optical arithmetic unit with the help of terahertz-optical-asymmetric-demultiplexer-based tree architecture." Applied Optics 47.7 (2008): 933-943.

Bordacs, Sandor, et al. "Chirality of matter shows up via spin excitations." Nature Physics 810 (2012): 734-738.

Bowlan, P., et al. "Directly probing spin dynamics in insulating antiferromagnets using ultrashort terahertz pulses." Physical review B 94.18 (2016): 184429.

Szaller, Dávid, et al. "Effect of spin excitations with simultaneous magnetic- and electric-dipole character on the static magnetoelectric properties of multiferroic materials." Physical Review B 89.18 (2014): 184419.

Sushkov, A. B., et al. "Electromagnons in multiferroic $YMn_2O_5$ and $TbMn_2O_5$." Physical review letters 98.2 (2007): 027202.

Namai, Asuka, et al. "Hard magnetic ferrite with a gigantic coercivity and high frequency millimetre wave rotation." Nature communications 3.1 (2012): 1-6.

Khaja Mohaideen, K., and P. A. Joy. "High magnetostriction and coupling coefficient for sintered cobalt ferrite derived from superparamagnetic nanoparticles." Applied Physics Letters 101.7 (2012): 072405.

Walther, Till, et al. "Hysteretic magnetoelectric behavior of $CoFe_2O_4$—$BaTiO_3$ composites prepared by reductive sintering and reoxidation." Journal of Materials Chemistry C 4.21 (2016): 4792-4799.

Kamba, S., et al. "Infrared and terahertz studies of polar phonons and magnetodielectric effect in multiferroic $BiFeO_3$ ceramics." Physical Review B 75.2 (2007): 024403.

Mbonye, Marx, Rajind Mendis, and Daniel M. Mittleman. "Inhibiting the TE 1-mode diffraction losses in terahertz parallel-plate waveguides using concave plates." Optics express 20.25 (2012): 27800-27809.

Dutta, Moumita, et al. "Low frequency piezoresonance defined dynamic control of terahertz wave propagation." Scientific reports 6 (2016): 38041.

Betal, Soutik, et al. "Magneto-elasto-electroporation (MEEP): In-vitro visualization and numerical characteristics." Scientific reports 6 (2016): 32019.

Takahashi, Youtarou, et al. "Magnetoelectric resonance with electromagnons in a perovskite helimagnet." Nature Physics 8.2 (2012): 121-125.

Grady, Nathaniel K., et al. "Terahertz metamaterials for linear polarization conversion and anomalous refraction." Science 340.6138 (2013): 1304-1307.

Eerenstein, Wilma, N. D. Mathur, and James F. Scott. "Multiferroic and magnetoelectric materials." nature 442.7104 (2006): 759-765.

Zheng, Haimei, et al. "Multiferroic $batio3$-$cofe2o4$ nanostructures." Science 3035658 (2004): 661-663.

Ramesh, Ramamoorthy, and Nicola A. Spaldin. "Multiferroics: progress and prospects in thin films." Nature materials 6.1 (2007): 21-29.

Choi, S. B., et al. "Nanopattern enabled terahertz all-optical switching on vanadium dioxide thin film." Applied Physics Letters 98.7 (2011): 071105.

Shen, Jianxin, et al. "Nonvolatile memory based on nonlinear magnetoelectric effects." Physical Review Applied 6.2 (2016): 021001.

Wang, Jimmy H., et al. "Numerical approach for tailoring performance of magnetoelectric PZT/terfenol-D laminated composites." Journal of Applied Physics 107.8 (2010): 084110.

Slonczewski, J. C. "Origin of Magnetic Anisotropy in $Co_xFe_{3-x}O_4$." Journal of Applied Physics 29.3 (1958): 448-449.

Pimenov, Andrei, et al. "Possible evidence for electromagnons in multiferroic manganites." Nature physics 2.2 (2006): 97-100.

Bowlan, P., et al. "Probing ultrafast spin dynamics through a magnon resonance in the antiferromagnetic multiferroic $HoMnO_3$." Physical review B 94.10 (2016): 100404.

Ma, Jing, et al. "Recent progress in multiferroic magnetoelectric composites: from bulk to thin films." Advanced materials 23.9 (2011): 1062-1087.

Vinothini, V., Paramanand Singh, and M. Balasubramanian. "Synthesis of barium titanate nanopowder using polymeric precursor method." Ceramics international 32.2 (2006): 99-103.

Nlebedim, Ikenna C., et al. "Temperature dependence of the structural, magnetic, and magnetostrictive properties of zinc-substituted cobalt ferrite." Journal of Applied Physics 113.19 (2013): 193904.

Hochberg, Michael, et al. "Terahertz all-optical modulation in a silicon-polymer hybrid system." Nature materials 5.9 (2006): 703-709.

Zhang, Peng, et al. "Terahertz magnetic circular dichroism induced by exchange resonance in $CoCr_2O_4$ single crystal." Optics express 2314 (2015): 17805-17814.

Kamaraju, N., et al. "Terahertz magneto-optical spectroscopy of a two-dimensional hole gas." Applied Physics Letters 106.3 (2015): 031902.

Huisman, T. J., et al. "Terahertz magneto-optics in the ferromagnetic semiconductor $HgCdCr_2Se_4$." Applied Physics Letters 106.13 (2015): 132411.

Heyman, J. N., et al. "Ultrafast terahertz Faraday rotation in graphene." Journal of Applied Physics 116.21 (2014): 214302.

Nakajima, M., et al. "Ultrafast time domain demonstration of bulk magnetization precession at zero magnetic field ferromagnetic resonance induced by terahertz magnetic field." Optics express 18.17 (2010): 18260-18268.

Hill, Nicola A. "Why are there so few magnetic ferroelectrics?." (2000): 6694-6709.

Dutta, et al., "Magnetoelastoelectric coupling in core-shell nanoparticles enabling directional and mode selective magnetic control of THz beam-propagation", Nanoscale, Royal Society of Chemistry, 2017.

\* cited by examiner

MAGNETOELECTRIC-BASED SYSTEMS AND METHODS FOR MODULATING TERAHERTZ BEAMS

CROSS-REFERENCE TO RELATED APPLICATION

This application claims priority to co-pending U.S. Provisional Application Ser. No. 62/658,233, filed Apr. 16, 2018, which is hereby incorporated by reference herein in its entirety.

BACKGROUND

Recent advances in ultrafast nonlinear optics have caused the terahertz (THz) spectral window (100 GHz-10 THz), lying between the microwave and infrared regions, to gain prominence. This yet-to-be fully explored spectral band is now attracting much attention for its potential in future millimeter and submillimeter wave communications and sensing. Needed for such applications are systems and methods for modulating THz beams.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, needed are systems and methods for modulating terahertz (THz) beams for the purpose of exploiting the THz spectral window for communications and/or sensing applications. Disclosed herein are examples of such systems and methods. In one embodiment, a system comprises a multiferroic nanoparticle heterostructure through which a THz beam propagates. In some embodiments, the heterostructure comprises a plurality of multiferroic nanoparticles that each includes a ferromagnetic core that is surrounded by a ferroelectric shell. The multiferroic nanoparticles are sandwiched between two thin substrates, such as mica substrates, and the heterostructure is positioned within an external direct current (DC) magnetic field that is either parallel or anti-parallel to the propagation direction of the THz beam. When the magnetic field is antiparallel to the direction of the beam, the amplitude of the beam can be modulated. When the magnetic field is parallel to the direction of the beam, both the amplitude and the phase of the beam can be modulated.

In the following disclosure, various specific embodiments are described. It is to be understood that those embodiments are example implementations of the disclosed inventions and that alternative embodiments are possible, including "hybrid" embodiments that include features of one or more different embodiments. All such embodiments are intended to fall within the scope of this disclosure.

Introduction

In today's world of miniaturization, where nanotechnologies are providing promising solutions for future applications, researchers are now trying to exploit such nanotechnologies in the millimeter and submillimeter wave regimes. In particular, nanostructures are being explored for the generation, detection, and manipulation of THz radiation. Be it nanometer field-effect transistors (FETs), nano-hot electron bolometers, THz modulators based on plasmonic or graphene, THz vacuum nanoelectronics, THz polarizers based on ferrofluids or polymer-embedded magnetic nanoparticles, superparamagnetic-nanoparticle enhanced THz imaging, or wireless nanosensor networks for nanorobots, it is evident that nanostructures are likely to play a significant role in the development of future THz systems for many real-world applications. In the disclosure that follows, a novel approach is described in which strain-mediated magnetoelectric coupling in a multiferroic nanoparticle heterostructure results in dynamically tunable, magnetic field direction-defined, amplitude/phase mode-selective modulation of THz beams.

Magnetoelectric multiferroics are a family of advanced electronic materials that simultaneously possess both magnetism and ferroelectricity. Although studies have been conducted on the realization of multiferroic effects in both bulk and heterostructured materials, few have examined strain-mediated magnetoelectricity at THz frequencies. In fact, previous research on probing magnetoelectric coupling with THz radiation has mostly examined single-phase systems, in which ferromagnetic (FM) and ferroelectric (FE) order parameters coexist (e.g., rare earth manganites, perovskite helimagnets, or other multiferroic oxides). The inventors have studied magneto-elasto-electric (MEE) coupling in engineered multiferroic composite nanoparticles, in which dynamic coupling between the ferromagnetic and ferroelectric order parameters has been realized in a biphasic system.

The multiferroic nanoparticles comprise core-shell nanoparticles that comprise an FM core and an FE shell. One such nanoparticle that was studied is a nanoparticle comprising a cobalt ferrite ($CoFe_2O_4$, (CFO)) core and a barium titanate ($BaTiO_3$, (BTO)) shell. As mentioned above, assemblies of these nanostructures are operated under the influence of an external DC magnetic field, which, through magnetostriction in the FM core, induces stress-mediated piezoelectricity in the outer FE shell. When the magnetic field is applied antiparallel to the propagation direction of the traversing beam, amplitude modulation occurs owing to the magnetostrictive effect of the core. When the magnetic field applied along the propagation direction, however, the FM-FE coupling further enables an additional controllable phase modulation. This brings about an opportunity for nanoparticle-enabled dynamic THz wave propagation control by demonstrating a THz amplitude/phase mode-switch in which the mode of modulation can be dynamically switched by simply changing the direction of the applied external DC magnetic field.

Described below is a study in which core-shell nanoparticles and the multiferroic nanoparticle heterostructures were created and used to modulate a THz beam within external DC magnetic fields.

Synthesis and Characterization of CFO-BTO Nanoparticles

A hydrothermal method was employed to synthesize the FM-FE ([1−x] CFO-[x] BTO, where x=40 mol %) core-shell nanoparticles. Commercially available CFO nanoparticles (acquired from Alfa Aesar Inc.) were used for the cores. A polymerized method following the Pechini route of reaction was used to prepare the BTO shells utilizing the commercially available reagents barium carbonate ($BaCO_3$) and titanium tetraisopropoxide ($Ti[OCH(CH_3)_2]_4$).

Figure 1A:
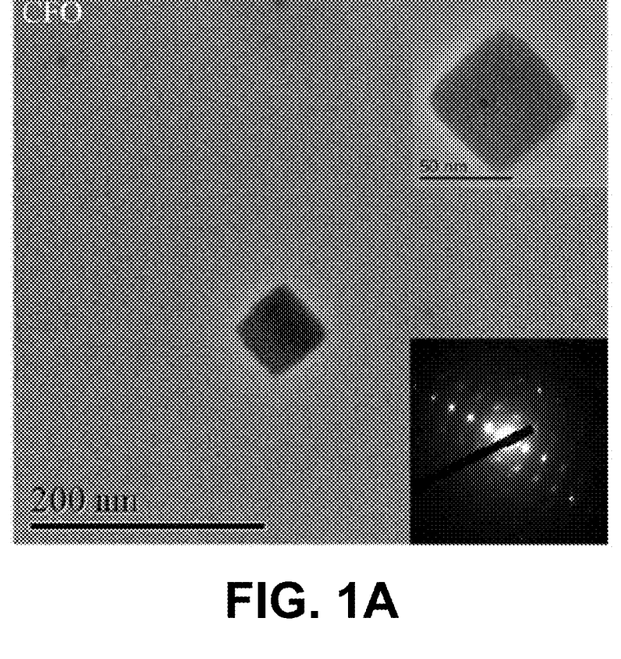
FIG. 1A is a transmission electron microscope (TEM) micrograph of a cubic cobalt ferrite (CFO) nanoparticle that can be used as the core of a multiferroic nanoparticle. An upper inset image shows the core magnified. A lower inset image shows the diffraction pattern of the core captured using selected area electron diffraction (SAED).
Figure 1B:
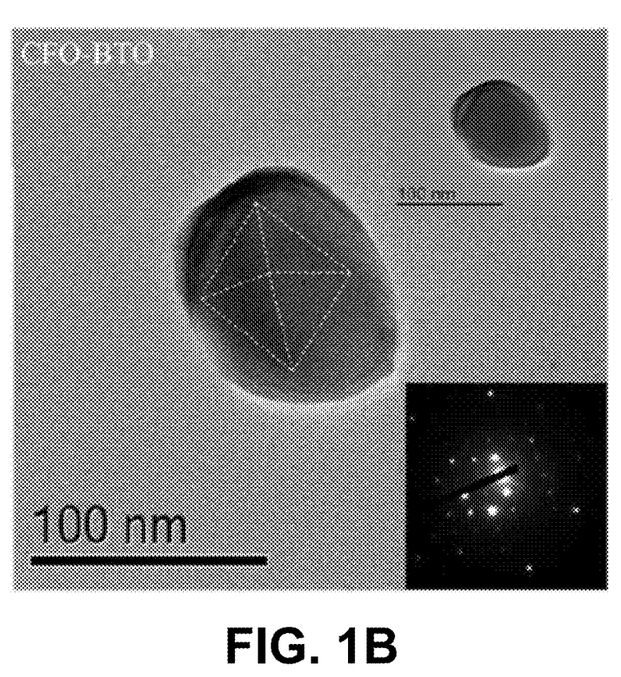
FIG. 1B is a TEM micrograph of a multiferroic nanoparticle comprising a CFO core and a barium titanate (BTO) shell. An upper inset image shows the multiferroic nanoparticle magnified. A lower inset image shows the diffraction pattern of the multiferroic nanoparticle captured using SAED.
Figure 1C:
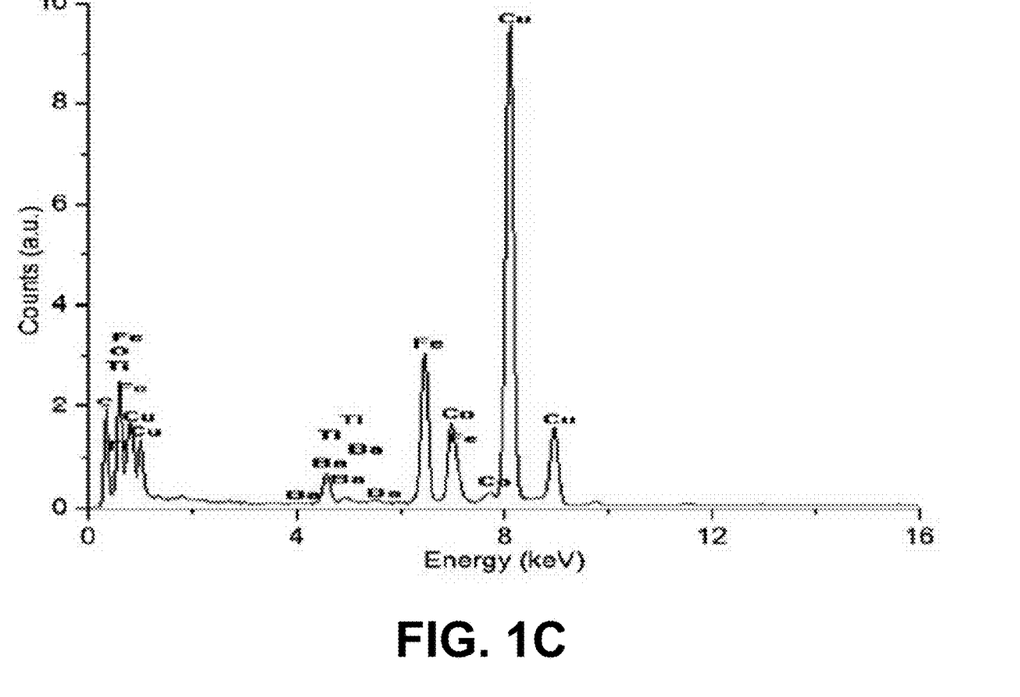
FIG. 1C is a graph that shows the chemical composition for both the core and the shell confirmed using energy dispersive x-ray by (EDX) spectroscopy (Cu-copper and C-carbon lines came from the sample grid).
Figure 1D:
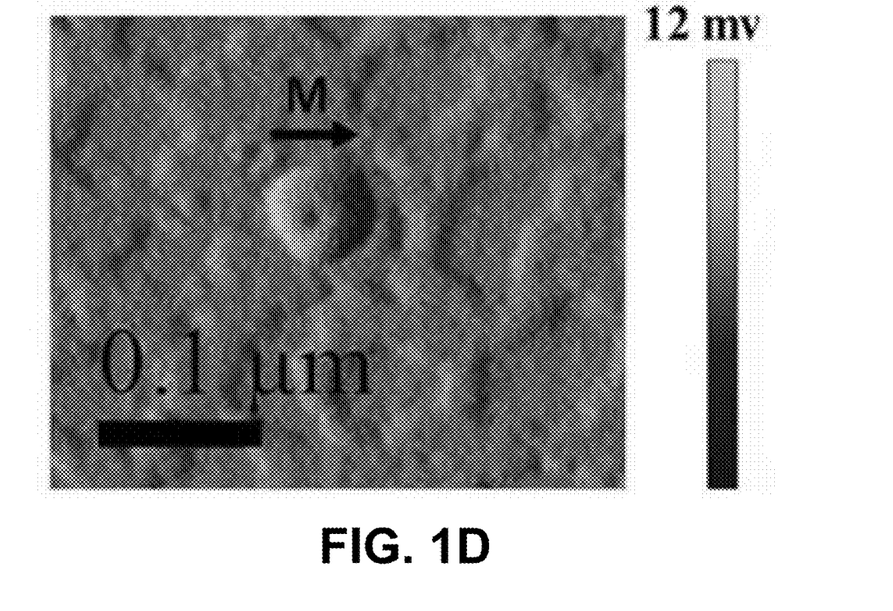
FIG. 1D demonstrates the formation of a magnetic dipole (M) as depicted by bright and dark contrasts at the two opposite edges of a CFO-BTO multiferroic nanoparticle, when probed with a magnetized tip.

The transmission electron microscope (TEM) images of FIG. 1 show that, while the FM CFO core ($T_c$=790 K) has an average size of 50±5 nm with a cubic morphology, the core-shell CFO-BTO nanoparticle tends to acquire a tetrahedral polygon structure (FIGS. 1A and 1B, respectively). The nominal particle size of the fabricated core-shell nanoparticles was approximately 80±5 nm. Since the core retained its original size, the BTO shell has an approximate thickness of 30±5 nm. The crystalline nature of both the core and the shell was verified by their electron diffraction patterns (as shown in the lower insets of FIGS. 1A and 1B), with their chemical compositions confirmed by energy-dispersive X-ray (EDX) spectroscopy (FIG. 1C). A magnetic force microscope (MFM) image (FIG. 1D) reveals the formation of a magnetic dipole when probed with a magnetized tip, as depicted by bright and dark contrasts at the two opposite edges of the particle with the vortex represented by the dark spot at the center. The inherent FE properties of the BTO layer ($T_c$~395 K) were also validated to be conserved. The magnetic hysteresis of both CFO and CFO-BTO nanoparticles was further characterized by performing room temperature magnetization measurements.

Terahertz Magneto-Optical Experimental System

Figure 2A:
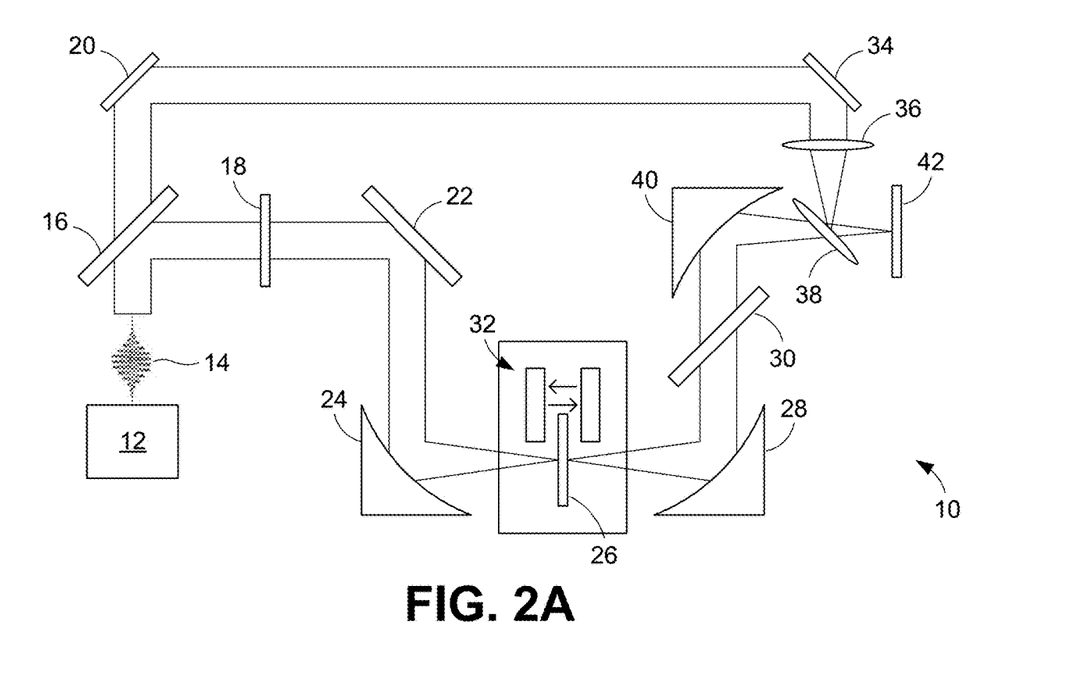
FIG. 2A is a schematic diagram of an embodiment of a system for modulating terahertz (THz) beams that was used for THz magneto-optical measurements.

An experimental THz time-domain spectroscopy (THz-TDS) system 10, shown in FIG. 2A, was set up to evaluate the ability to modulate THz beams using the nanoparticle heterostructure ("the sample") and external DC magnetic fields. Generally speaking, the system 10 includes various components that can be used in a commercial embodiment of a system for modulating terahertz beams. The system 10 is based on a 1 kHz, 800 nm, 35 femtosecond (fs) Ti:sapphire amplifier 12. As shown in FIG. 2A, the output 14 from the Ti:sapphire amplifier 12 is split by a beam splitter 16. A first part of the signal is delivered to a (110) cut ZnTe (0.5 mm thick) crystal 18 for optical rectification for THz generation and electro-optic sampling using a 2 mm thick (110) cut ZnTe crystal 42. A second part of the signal is delivered to a mirror 20.

Figure 2B:
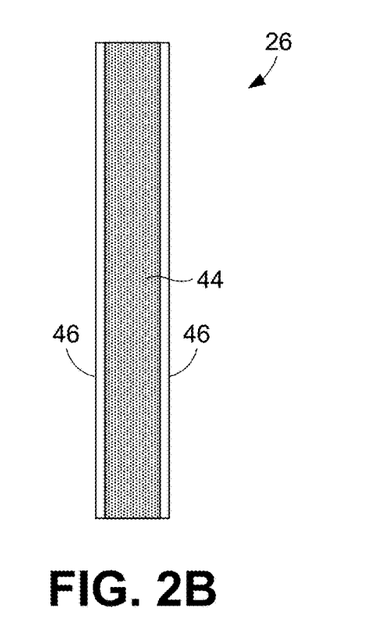
FIG. 2B is a schematic view of a nanoparticle heterostructure used in the system of FIG. 2A.

With further reference to FIG. 2A, the THz beam is reflected off of a first wire-grid polarizer 22 and a first off-axis parabolic mirror 24 to the nanoparticle heterostructure 26. The system 10 further includes a second off-axis parabolic mirror 28 and a second wire-grid polarizer 28 on the opposite side of the nanoparticle heterostructure 26. With reference to FIG. 2B, the nanoparticle heterostructure 26 comprises a plurality of multiferroic nanoparticles 44 that are positioned (sandwiched) between two thin, parallel substrates 46, such as mica substrates. The multiferroic nanoparticles 44 each comprise a ferromagnetic core that is surrounded by a ferroelectric shell. In some embodiments, the ferromagnetic cores can be approximately 45 to 55 nm in width, length, and depth and the ferroelectric shell can be approximately 30 to 40 nm thick, resulting in a multiferroic nanoparticles having dimensions of approximately 75 to 85 nm.

Referring again to FIG. 2A, the nanoparticle heterostructure 26 is positioned within a split-coil superconducting magnet 32 that can apply a magnetic field perpendicular to the heterostructure 26 within a range of approximately 0 to ±4 T. The second beam reflected by the mirror travels to a second mirror 34, which reflects the beam to a lens 36 that focuses the beam on a pellicle beam splitter 38. Also passing through the pellicle beam splitter 38 is the modulated beam after it is reflected by a third off-axis parabolic mirror 40. Both beams are then received by the aforementioned second (110) cut ZnTe crystal 42.

During the experiments, all THz measurements obtained using the system 10 were acquired in the dark (eliminating ambient light) while ensuring that no stray radiation/laser light reached the nanoparticle heterostructure 26. The both the x and y components of the transmitted THz beam was recorded.

Directional Control of THz Wave Propagation

To realize magnetic field direction-defined THz wave propagation control, the experiments were carried out in four different configurations using an input THz beam polarized along the x direction ($\vec{E}_{THz}$) and propagating along the z direction (wave vector k∥Hz). THz temporal profiles $E_x^t$ and $E_y^t$, were captured after transmission through the sample, with the external static magnetic field 1 T≤±B≤4 T applied parallel (+B) and antiparallel (−B) to z. Measurements were performed for both CFO and CFO-BTO separately to decouple their respective contributions. For each set of THz-TDS measurements, nanoparticles with a layer thickness of approximately 100 μm were assembled between two mica substrates. The reference THz-TDS waveforms were measured with only the two substrates.

Figure 3:
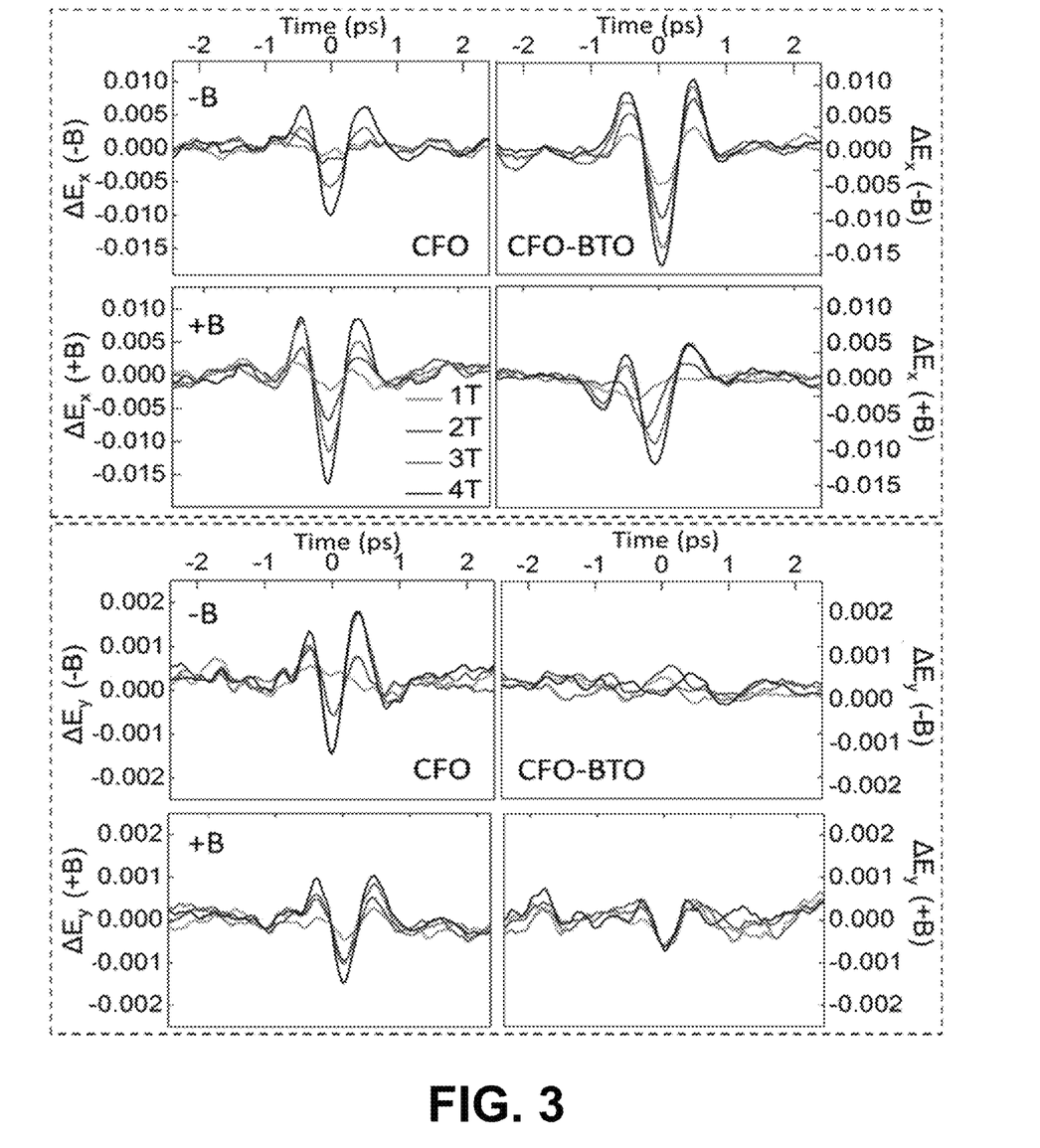
FIG. 3 includes graphs that show temporal traces of THz pulses transmitted through CFO and CFO-BTO along x $\Delta E_x(\pm B)$, and y polarizations, $\Delta E_y(\pm B)$, after being subtracted from the transmitted THz pulse for B=0, with a magnetic field (B) of 1-4 T applied both parallel (+) and anti-parallel (−) to the wave propagation direction. The upper group of graphs shows the traces recorded along the x polarization and the lower group of graphs shows the traces recorded along the y polarization, with the left panel containing the traces for CFO and the right for CFO-BTO in the order of −B (top) and +B (bottom).

As shown in FIG. 3, the temporal waveforms of the THz pulses transmitted through the nanocomposites exhibit prominent differences depending on the direction of the applied field and the polarization of the transmitted beam. In the case of CFO, for both +B and −B, the relative x-polarized waveforms, $\Delta E_x(\pm B) \approx (E_x^t(\pm B)-E_x^t(B=0))$, only exhibit changes in amplitude, with varying applied fields. While a similar amplitude change is observed for THz pulses transmitted through CFO-BTO for −B, the amplitude changes are accompanied by pronounced phase delays in the case of +B.

Similar field-dependent amplitude variations were also observed for the relative y-polarized waveforms, $\Delta E_y(\pm B) \approx (E_y^t(\pm B)-E_y^t(B=0))$ transmitted through CFO. However, very little field-dependent response was measured for CFO-BTO along this polarization direction.

Figure 4A:
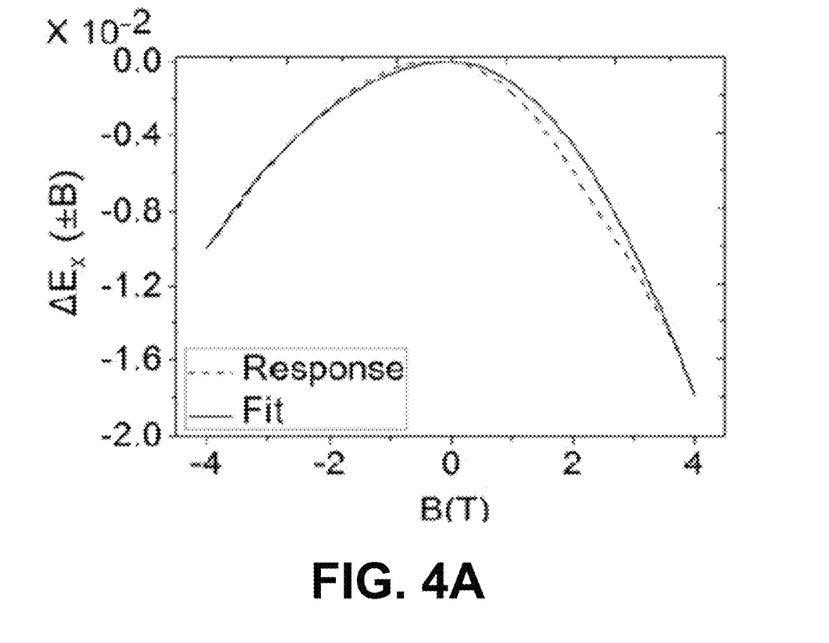
FIG. 4A is a graph that shows the maxima of the relative transmitted THz-signal intensities for CFO along the x-polarization, max ($\Delta E_x(\pm B)$), reveals a quadratic dependence on the applied magnetic field (data shown in blue and the quadratic fit in black).

Magnetostriction and Faraday Rotation Influencing THz Propagation in CFO Nanoparticles To understand the phenomena observed for CFO-BTO nanoparticles, one must first understand how the transmitted THz radiation is affected by the CFO nanoparticles alone. FIG. 4A shows the maxima of the relative amplitude changes observed for CFO, max $(\Delta E_x(\pm B)|_{CFO})$, as a function of the applied magnetic field. A quadratic model, $\Delta E_x(\pm B) = \Gamma B^2$, was found to be its closest fit, where the fitting coefficient Γ attains a value of −0.0006 mV T$^{-2}$ for −4 T≤B<0 T and −0.00112 mV T$^{-2}$ for 0 T<B≤4 T. This field-dependent amplitude change observed in the propagating THz beam is attributed to the magnetostrictive effect of the CFO nanoparticles, which was reported to similarly influence the THz magnetochromism, i.e., the difference observed in the THz absorption intensity with and without a magnetic field, in another room-temperature ferrimagnet, $Ba_2Mg_2Fe_{12}O_{22}$.

Magnetostriction is described by a 4$^{th}$-rank tensor, $x_{lm}=N_{lmjk} \cdot H_j \cdot H_k$, where $x_{lm}$, $N_{lmjk}$, and Hj,k represent the strain, magnetostrictive coefficient, and applied magnetic field tensor components, respectively. Inverse spinel structured ($AB_2O_4$) CFO is known to exhibit magnetic anisotropy and possesses a strong magnetostrictive property. The quadratic fitting coefficient Γ can therefore be defined as Γ=yΔd, where y is the absorption coefficient per unit thickness and the relative change of the material thickness Δd is a function of the effective magnetostriction $\Delta d \langle x_{lm}=N_{lmjk} \cdot H_j \cdot H_k \rangle$.

Figure 4B:
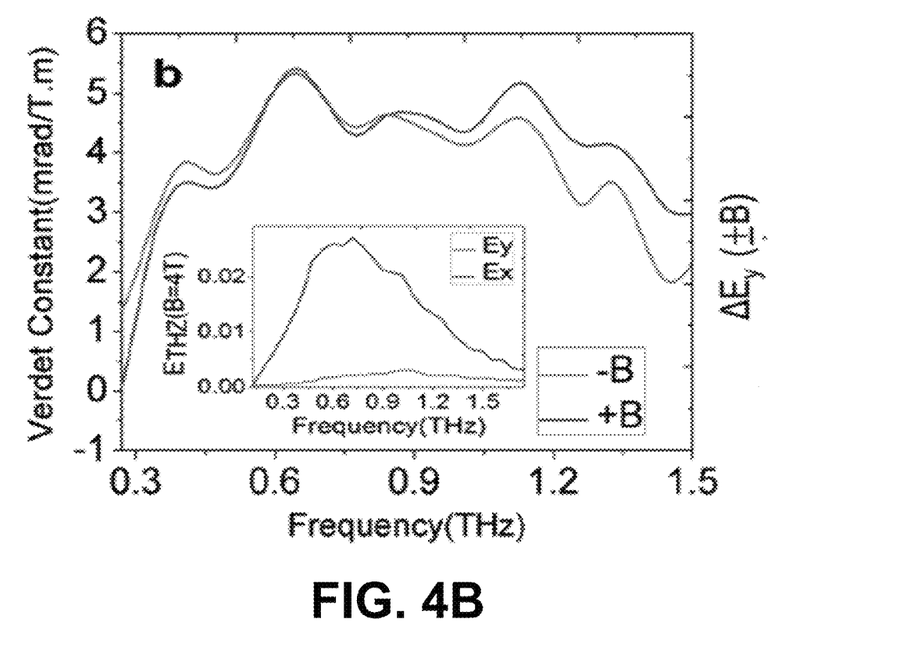
FIG. 4B is a graph that shows the Verdet constant calculated from $E_x$ and $E_y$ responses of CFO, for both the magnetic field directions ±B. Calculated up to 1.5 THz, taking into consideration a reasonable signal to noise ratio as depicted in their frequency spectra in the inset.

Furthermore, a large $\Delta E_y(\pm B)|_{CFO}$ signal was also recorded. Although it appears to have a similar dependence on the applied field, the signal's amplitude is five to six times less than that of $\Delta E_x(\pm B)|_{CFO}$ (see FIG. 3). For ferromagnetic CFO, this phenomenon is attributed to Faraday rotation. The Faraday rotation angle $\theta_F$, when extracted from the $E_x$ and $E_y$ polarization components of the transmitted THz beam up to 1.5 THz (at higher frequencies the noise prevented a reliable measurement of the angle), gives a Verdet constant of approximately 5 mrad T$^{-1}$ m$^{-1}$ over 0.45-1.3 THz (FIG. 4b). Although the rotation is not large enough to achieve a non-reciprocal isolation, it contributes to the directional mode-switch as described below.

The changes in amplitude observed in the THz beam while transmitted through the CFO nanoparticles $\Delta E_{x,y}(\pm B)|_{CFO}$ are thus described as a combined effect of magnetostriction and Faraday rotation. The differences observed in the value of Γ for (+)ve and (−)ve B (as mentioned above) can therefore be explained as a contribution from Faraday rotation, where the magnetization of the CFO nanoparticles induced by the applied magnetic field changes $\Delta E_x(\pm B)|_{CFO}$ by rotating the polarization of the incident THz beam $\vec{E}_{THz}$ towards the y direction, in addition to that caused by the magnetostrictive effect.

Figure 4C:
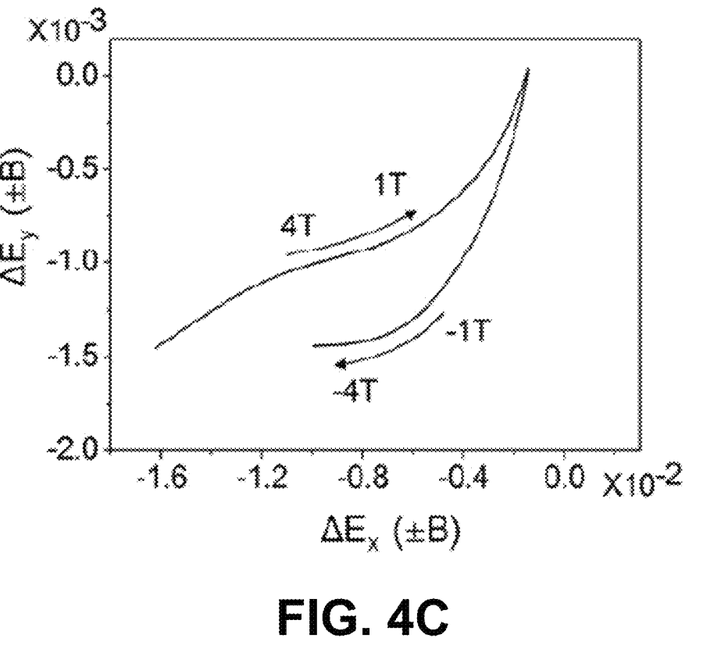
FIG. 4C is a graph that shows the relative responses for CFO along the y polarization, $\Delta E_y(\pm B)$, plotted against that along the x polarization, $\Delta E_x(\pm B)$, show a hysteretic behavior.

Although, from the magnetization measurements, it appears that B is mostly higher than the saturating field for CFO $H_{sat|CFO}$ (1.184 T), it should be taken into consideration that the magnetization measurements were performed at room temperature, while the THz measurements were taken at 4 K. The increase in coercive fields observed with decreasing temperature explains why it will still retain its nonlinear behavior even at higher values of the applied field, as corroborated by the hysteretic response exhibited when $\Delta E_y(\pm B)|_{CFO}$ and $\Delta E_x(\pm B)|_{CFO}$ were plotted together (FIG. 4C).

Finally, the shifted maxima in the curve of FIG. 4A with respect to B=0 and the differences observed for the values of (+) ve and (−) ve B in FIG. 4B can be attributed to an initial magnetic biased condition of the CFO nanoparticles (primarily developed during its crystalline growth), as substantiated by their net negative surface charge.

Figure 5A:
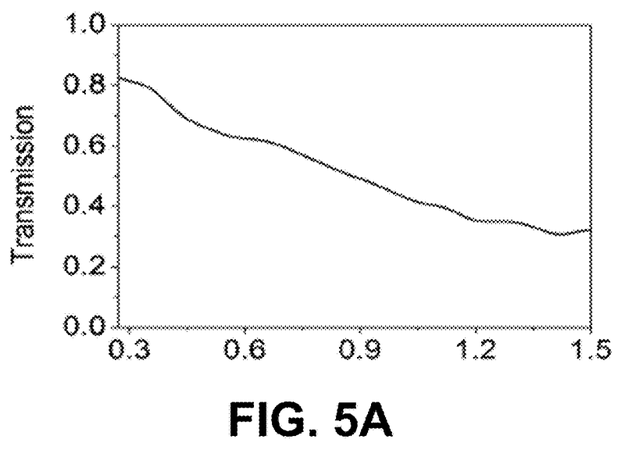
FIG. 5A is a graph that shows transmission spectra for the CFO-BTO nanoparticles (at zero magnetic field).
Figure 5B:
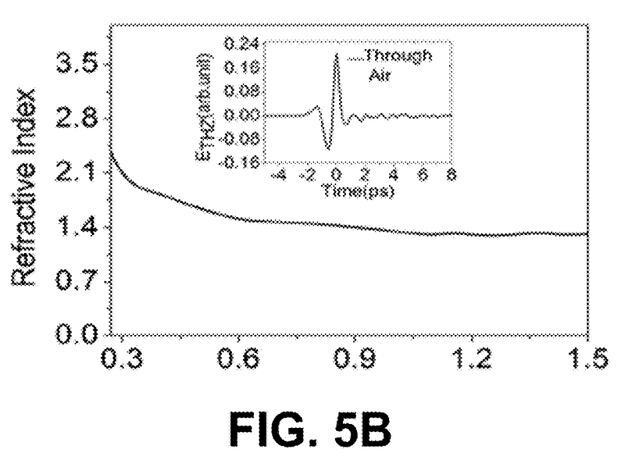
FIG. 5B is a graph that shows the refractive index for the CFO-BTO nanoparticles (at zero magnetic field), along with the reference THz signal through air shown in the inset.
Figure 5C:
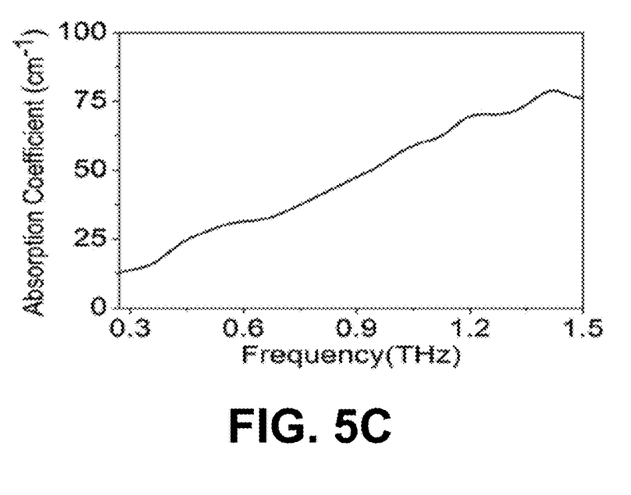
FIG. 5C is a graph that shows the absorption coefficient for the CFO-BTO nanoparticles (at zero magnetic field).

Magnetostrictive-Magnetoelastoelectric Interactions in FM-FE Nanocomposite System Having established that the observed THz amplitude modulation in CFO nanoparticles is due to magnetostriction and Faraday rotation, focus is now directed to the magnetoelectric CFO-BTO nanoparticles. The transmission spectra (along with the reference THz signal through air) and the extracted refractive index and absorption coefficient of the nanoparticles are shown in FIG. 5. The magnetoelectric effect is essentially a mechanism that induces an electric $P_i$ (magnetic $M_i$) polarization by applying a magnetic $H_j$ (electric $E_j$) field. The THz modulation observed in the CFO-BTO system is caused by the coupled strain-mediated magnetoelastoelectric (MEE) effect. The dynamical MEE coupling coefficient $a_{ijk}$ is proportional to the product of the piezoelectric ($d_{iop}$) and magnetostrictive coefficients ($N_{lmjk}$) as given by Equation (1) below, and thus is dictated by the anisotropic crystal symmetries of the materials involved:

$$a_{ijk[3\times 6]} \equiv d_{ioP[3\times 6]} \cdot N_{lmjk[6\times 6]}$$    Equation (1)

Figure 6A:
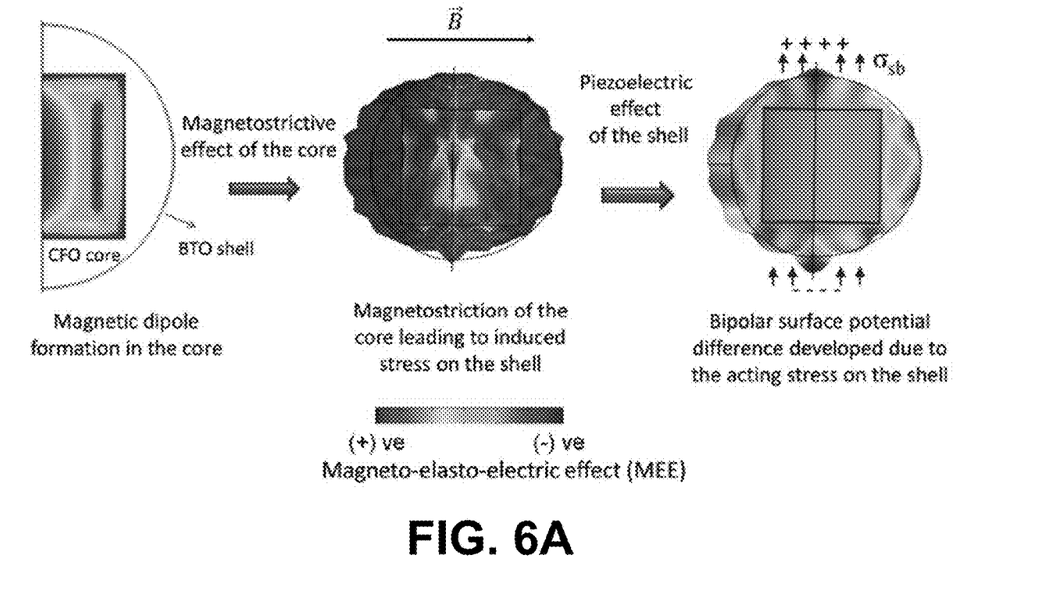
FIG. 6A is an illustration of a finite element analysis (FEA) simulation of magneto-elasto-electric (MEE) effect performed by using the Comsol Multiphysics 4.4 suite and recreating the geometry of the CFO-BTO core-shell nanoparticle with the domains defined accordingly. It shows the magnetic dipole formation in the core (CFO), surface stress (induced by magnetostriction) and the surface polarization charge density $\vec{\sigma}_{sb}$ developed on the shell (BTO) due to the MEE effect, with the application of a DC magnetic field $\vec{B}$.

Heterostructured multiferroics are typically comprised of both magnetostrictive and piezoelectric phases that can potentially be coupled by an external field. CFO-BTO is structurally compatible, and thus has been used to fabricate the core-shell nanocomposites presented here. Physically, the applied external static magnetic field B produces a variation in the strain components of the magnetostrictive CFO cores due to the field dependent orientation of their magnetic dipoles. This magnetostrictive energy originating from the core is mechanically coupled to the FE BTO shell through their common boundaries. Owing to this coupling, the electric dipoles of the piezoelectric BTO layer subsequently develop a stain-induced change in polarization density $\Delta P|_B \equiv Nq\Delta d$ (where N is the number of electric dipoles per unit volume, q is the charge content of each dipole, and $\Delta d$ is the relative shift in the charge separation invoked by the magnetostriction of the core). Considering a surface s enclosing the incremental volume involved, the normal component of polarization $\hat{n}\Delta P|_B$ develops a surface charge density $\sigma_{sb} = -\oint \hat{n} \cdot \Delta P|_B$ that satisfies the continuity condition of Gauss' law at the surface of the nanoparticles. A finite element analysis (FEA) simulation corroborated this postulation (FIG. 6A) where, despite having a near-spherical core-shell morphology, due to the established magnetization in the CFO core a net electric polarization perpendicular to the magnetic dipole direction is developed (the formation of magnetic dipoles has been experimentally confirmed by the magnetic force microscopic measurements shown in FIG. 1D). The magnetostrictive strain generated by the core gets transferred to the clamped layer of the surrounding BTO shell and, owing to its non-vanishing piezoelectric coefficients, a bipolar surface polarization charge density is induced.

One important and unique functionality originating from the observed MEE coupling of the CFO-BTO nanoparticles is its directional response to the applied DC magnetic field. As can be seen in FIG. 3, for -B, only an amplitude change like that of the CFO nanoparticles is observed, which indicates an insignificant contribution from the ferroelectric BTO shell. Comparing the magnetic and MEE hysteresis of CFO-BTO nanoparticles has revealed that the MEE coercivities are about half the magnetic coercivities. This suggests that the MEE effect is diminished quite early, even though the magnetization still exists. Thus, while an initial (spontaneous) polarization is developed due to the static MEE effect, it is prevented from further increase with the increasing magnetization of the core. This explains why, despite having a BTO shell, an insignificant contribution from the field-dependent magnetoelectric effect is observed for -B.

Figure 6B:
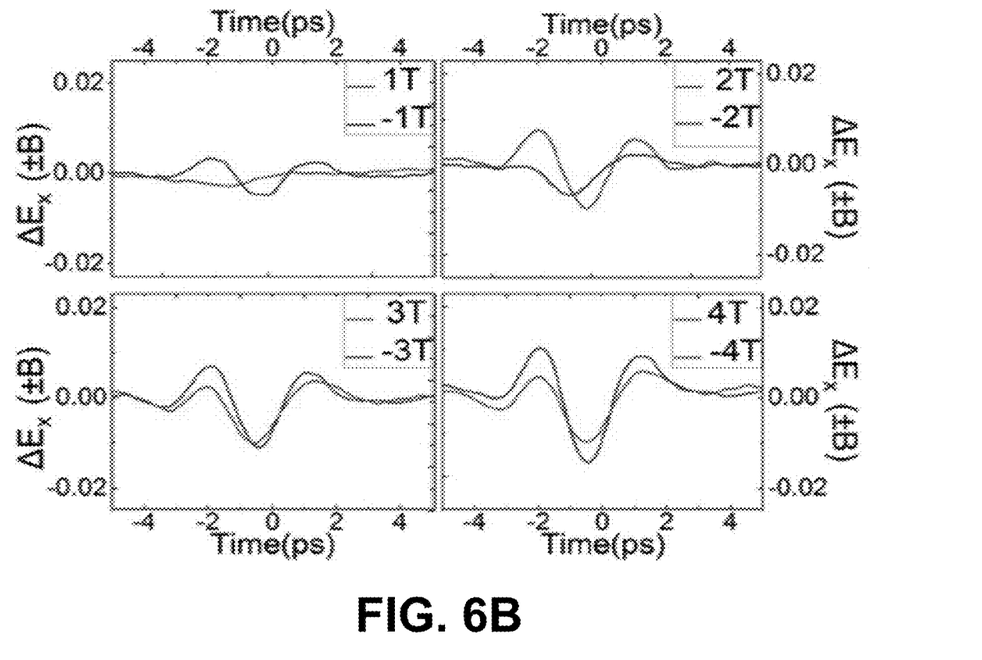
FIG. 6B includes graphs that show the relative phase shifts $\Delta\phi$ observed for ±B<4 T brought about by the interaction of the electric field of the THz beam $\vec{E}_{THz}$ and localized electric field $\vec{E}_{sb}$ (developed by the reorientation of $\vec{\sigma}_{sb}$ due to the reversal of the applied magnetic field direction).
Figure 6C:
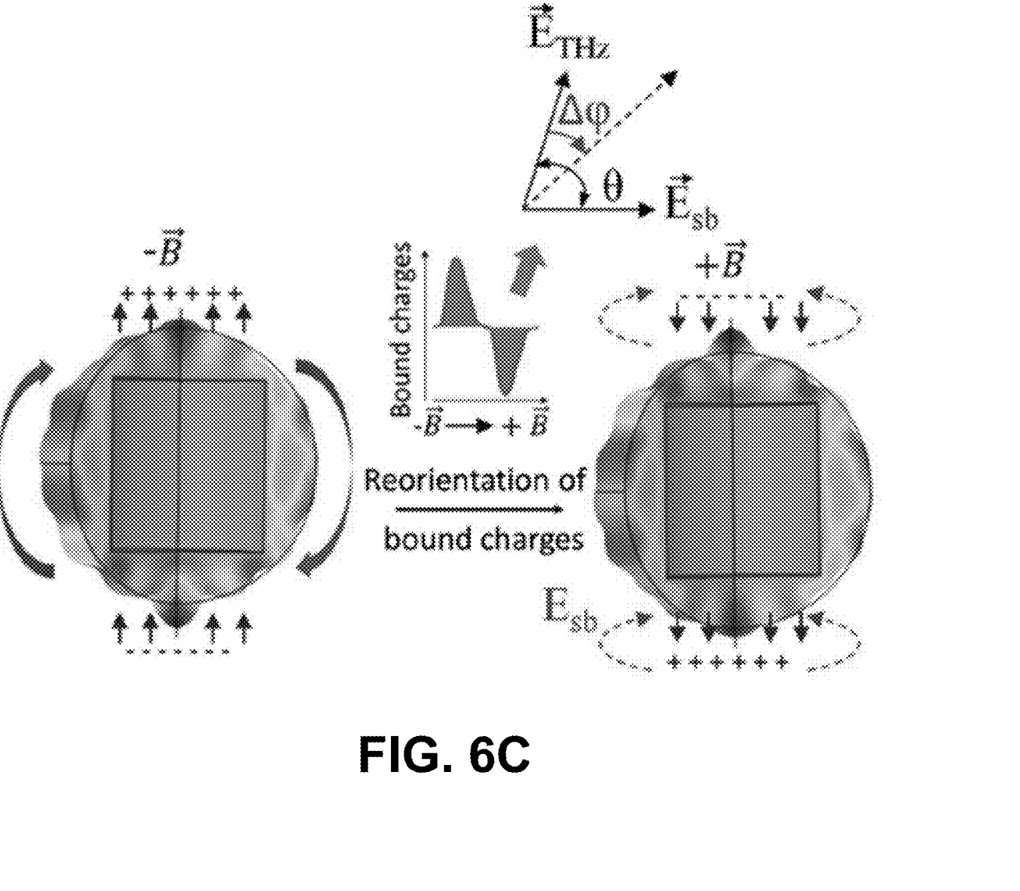
FIG. 6C is an illustration of the interaction of the electric field of the THz beam $\vec{E}_{THz}$ and localized electric field $\vec{E}_{sb}$ with θ being the angle between the two vectors.

On the other hand, for +B, dynamic phase shifts, $\Delta\phi$, are observed when the THz beam passes through the CFO-BTO nanoparticles. Its prominence becomes more clear when the relative temporal waveforms for +B and -B are plotted together (FIG. 6B). The relative phase delays are observed for B≤±3 T, above which the phase shifts disappear. In this case, when the magnetic field is reversed, i.e., from -B→+B, the magnetic dipoles of the CFO cores start orienting themselves in the opposite direction, which in turn leads to an eventual reorientation of the corresponding polarizations along with the associated displacement current, leading to the reestablishment of surface polarization charge density. It is due to this resultant screening and reestablishment of $\sigma_{sb}$ (as shown in FIG. 6C) that a localized electric field $$\vec{E}_{sb} = -\frac{1}{\varepsilon_0}\vec{\sigma}_{sb}$$

is developed (where $\varepsilon_0$ is the free-space permittivity). This $\vec{E}_{sb}$ therefore induces an additional field-dependent phase delay $\Delta\phi$ in the transmitted THz beam through an electro-optic effect, which depends on the two vectors involved and the angle between them, $\theta$; i.e., $\Delta\phi\langle \vec{E}_{THz}, \vec{E}_{sb}, \theta \rangle$.

If the effect for CFO-BTO along the y-polarization, $\Delta E_y(\pm B)|_{CFO-BTO}$ is observed (FIG. 3), then it can be seen that for -B, there is no discernible response. This can be explained by the fact that as BTO is non-magnetic, the induced magnetization is reduced, preventing any significant Faraday rotation. On the other hand, for +B, although a small response is observed, a dependence on the applied field is absent. A similar interaction between the THz electric field $\vec{E}_{THz}$ and $\vec{E}_{sb}$ (as explained above) can therefore be considered to explain the observed response in the case as well. It is the partial distribution of the $\vec{\sigma}_{sb}$ along they polarization that influences the THz beam propagation along this polarization direction, producing the observed $\Delta E_y(\pm B)|_{CFO-BTO}$.

Figure 7:
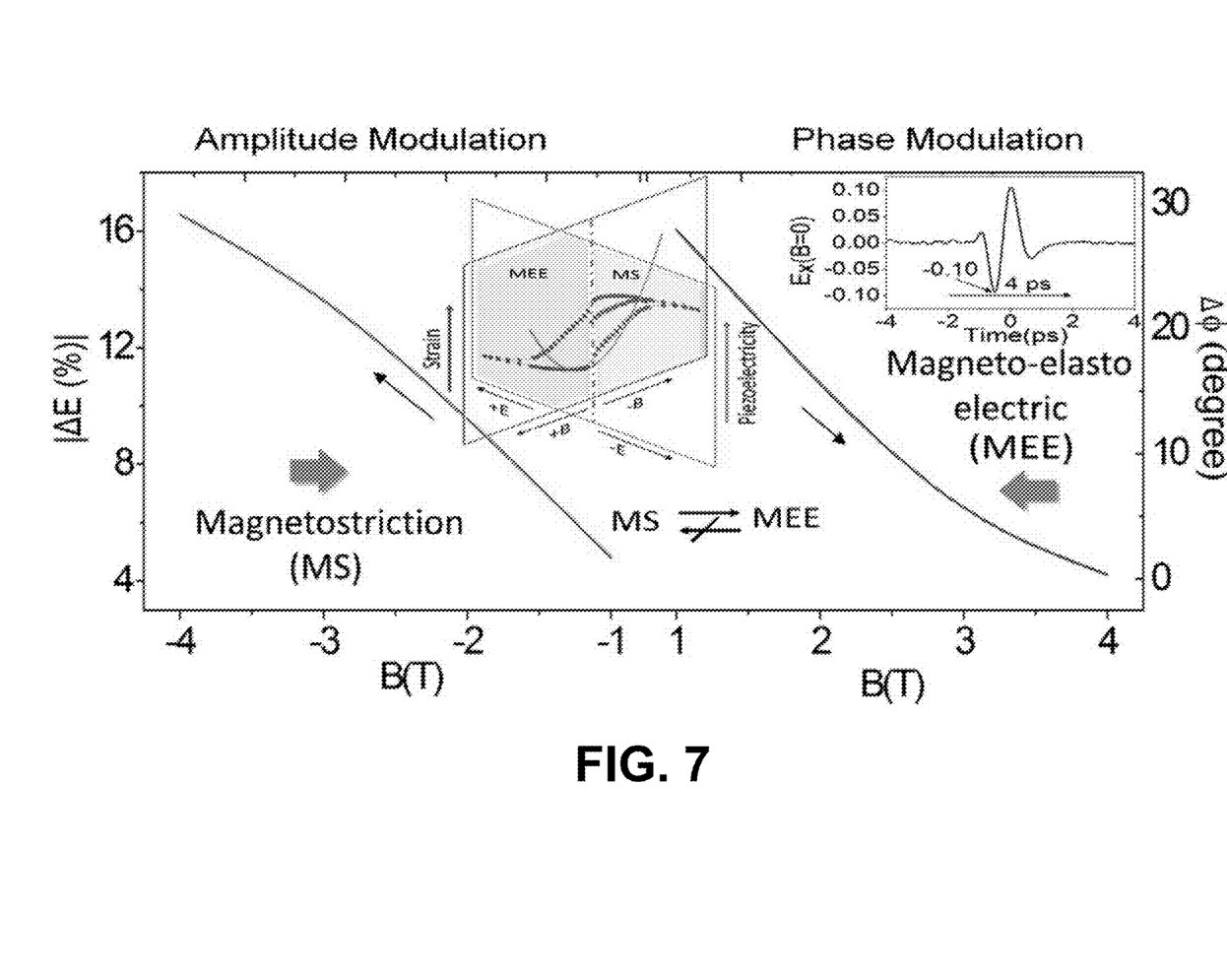
FIG. 7 is a graph that illustrates gradually increasing amplitude modulation |ΔE| that is observed when the magnetic field is applied in one direction, with a value of approximately 16.5% at −4 T, due to magnetostriction (MS). In the opposite direction, an additional phase modulation Δφ is observed (with the amplitude modulation reduced to a maximum value of 11.86% at 4 T), due to the MEE effect. Δφ decreases gradually, starting from 28° at 1 T. The THz beam transmitted through CFO-BTO with no field applied (B=0), used for calculating the amplitude and the phase modulation, is presented in the inset. The conditions for MS and the coupled MEE effect are also illustrated.

As demonstrated in FIG. 7, the engineered CFO-BTO core-shell nanocomposites therefore lead to a relative amplitude modulation of approximately 16.5% for B=-4 T. On the other hand, for +B they primarily enable phase modulation (where the amplitude modulation gets limited to 11.86% at 4 T, due to the reduced magnetization impeded by the non-magnetic BTO shell, as explained above), with a relative phase change of $\Delta\phi$, originating from the reorientation of the surface polarization charge density due to the induced MEE effect. The relative phase change starts from $\Delta\phi=28°$ at 1 T and gradually decreases with increasing field. Moreover, the gradual decrease of the phase difference with increasing +B is an indication of the approaching conclusion of the reorientation process. The phase change $\Delta\phi$ was calculated from the relative time delays $\Delta t$ (in ps) observed between +B and -B, $\Delta E_x(\pm B)$ (FIG. 6B) and considering the time-period of $E_x(B=0)|_{CFO-BTO}$ to be 4 ps (as shown in the inset of FIG. 7), $\Delta\phi = \Delta t \cdot 360/4$.

It is noted that the study was performed at high magnetic fields (up to 4 T) and at cryogenic temperatures (4 K) and therefore the performance might appear to be limited as compared with previous reports on the magnetic manipulation of THz waves performed under low magnetic fields. However, it is emphasized that not only the strain-mediated dynamic coupling between a ferromagnetic and a ferroelectric order parameter has been explored in a biphasic system, but the novelty offered by each of the phases has also been exploited to realize a magnetic-field direction-defined THz amplitude/phase mode-switch using an engineered core-shell nanocomposite system. It is believed this can potentially pave the way for new approaches, facilitating biphasic-nanoparticle enabled novel THz modulator designs.

Conclusions

It was demonstrated that MEE coupling in a biphasic nanocomposite system leads to a dynamically tunable non-contact magnetic field direction-defined amplitude/phase mode-selective modulation of THz waves. The magnetoelasto-electric (MEE) effect explored in the above-described study is a strain-mediated dynamic coupling between the ferromagnetic and ferroelectric order parameters, which is engineered and realized in a multiferroic $CoFe_2O_4$—$BaTiO_3$ core-shell nanocomposite system. When the magnetic field is applied antiparallel to the THz wave propagation direction, the magnetostrictive (MS) effect is dominant and an amplitude modulation is achieved owing to the contribution from the CFO core of the nanocomposites. When the magnetic field is applied along the direction of the THz wave propagation, the coupled magnetoelastoelectric (MEE) effect is dominant and an additional controllable phase modulation is achieved owing to the coupled-phenomena between the magnetostriction in the core and piezoelectricity in the shell of the nanocomposites. While the relative change in amplitude continues to increase with magnetic field, attaining a value of 16.5% at 4 T, the relative phase-change starts from a value of 28° at 1 T and gradually decreases with increasing field until the reorientation process concludes at 4 T. Both the observed amplitude and phase modulations are achieved in a layer of assembled biphasic nanocomposites of approximately 100 μm thickness. This novel approach therefore demonstrates the potential of engineered biphasic multiferroic nanocomposites in realizing magnetic field control over THz beam propagation.

The invention claimed is:

1. A system for modulating a terahertz beam comprising:
   a multiferroic nanoparticle heterostructure through which a terahertz beam can be propagated; and
   means for applying an external direct current (DC) magnetic field to the multiferroic nanoparticle heterostructure and the terahertz beam propagating through it, wherein application of the DC magnetic field modulates one or both of an amplitude and a phase of the terahertz beam.

2. The system of claim 1, wherein the multiferroic nanoparticle heterostructure comprises a plurality of multiferroic nanoparticles.

3. The system of claim 2, wherein the multiferroic nanoparticles each comprise a ferromagnetic core that is surrounded by a ferroelectric shell.

4. The system of claim 3, wherein the cores are made of cobalt ferrite and the shells are made of barium titanate.

5. The system of claim 3, wherein the cores have an outer dimension of approximately 30-50 nanometers and the nanoparticles have an outer dimension of approximately 50-80 nanometers.

6. The system of claim 2, wherein the multiferroic nanoparticle heterostructure further comprises dielectric substrates between which the multiferroic nanoparticles are sandwiched.

7. The system of claim 6, wherein the opposed substrates comprise of terahertz transparent dielectric substrates.

8. The system of claim 1, wherein the means for applying an external direct current (DC) magnetic field comprise electromagnetic or superconducting magnets.

9. The system of claim 1, wherein when the DC magnetic field is applied in a direction antiparallel to the direction of propagation of the terahertz beam, the amplitude of the beam is modulated.

10. The system of claim 1, wherein when the DC magnetic field is applied in a direction parallel to the direction of propagation of the terahertz beam, primarily the phase of the beam is modulated.

11. A method for modulating a terahertz beam comprising:
    propagating a terahertz beam through a multiferroic nanoparticle heterostructure; and
    applying an external direct current (DC) magnetic field to the multiferroic nanoparticle heterostructure and the terahertz beam propagating through it, wherein application of the DC magnetic field modulates one or both of an amplitude and a phase of the terahertz beam.

12. The method of claim 11, wherein the multiferroic nanoparticle heterostructure comprises a plurality of multiferroic nanoparticles.

13. The method of claim 12, wherein the multiferroic nanoparticles each comprise a ferromagnetic core that is surrounded by a ferroelectric shell.

14. The method of claim 13, wherein the cores are made of cobalt ferrite and the shells are made of barium titanate.

15. The method of claim 13, wherein the cores have an outer dimension of approximately 30-50 nanometers and the nanoparticles have an outer dimension of approximately 50-80 nanometers.

16. The method of claim 12, wherein the multiferroic nanoparticle heterostructure further comprises dielectric substrates between which the multiferroic nanoparticles are sandwiched.

17. The method of claim 16, wherein the opposed substrates comprise of terahertz transparent dielectric substrates.

18. The method of claim 11, wherein applying an external direct current (DC) magnetic field comprises applying the DC magnetic field using electromagnetic or superconducting magnets.

19. The method of claim 11, wherein applying the DC magnetic field comprises applying the field in a direction antiparallel to the direction of propagation of the terahertz beam so as to modulate the amplitude of the beam.

20. The method of claim 11, wherein applying the DC magnetic field comprises applying the field in a direction parallel to the direction of propagation of the terahertz beam so as to primarily modulate the phase of the beam.

* * * * *